(12) United States Patent
Aksay et al.

(10) Patent No.: US 9,085,667 B2
(45) Date of Patent: *Jul. 21, 2015

(54) REINFORCED POLYMERIC ARTICLES

(71) Applicants: VORBECK MATERIALS CORPORATION, Jessup, MD (US); KORDSA GLOBAL ENDUSTRIYEL IPLIK VE KORD BEZI SANAYI VE TICARET A.S., Istanbul (TR)

(72) Inventors: Ilhan A. Aksay, Princeton, NJ (US); Bora Buyukdincer, Kocaeli (TR); Nurcin Javaherian, Kocaeli (TR); John S. Lettow, Washington, DC (US); Gustavo Pino, Istanbul (TR); Kate Redmond, Baltimore, MD (US); Ibrahim O. Yildirim, Istanbul (TR)

(73) Assignees: VORBECK MATERIALS CORPORATION, Jessup, MD (US); KORDSA GLOBAL ENDUSTRIYEL IPLIK VE KORD BEZI SANAYI VE TICARET A.S., Istanbul (TR)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,603

(22) Filed: Apr. 25, 2013

(65) Prior Publication Data

US 2013/0302588 A1 Nov. 14, 2013

Related U.S. Application Data

(63) Continuation of application No. 13/234,654, filed on Sep. 16, 2011, now Pat. No. 8,449,959, which is a continuation of application No. PCT/US2010/027440, filed on Mar. 16, 2010.

(60) Provisional application No. 61/160,590, filed on Mar. 16, 2009.

(51) Int. Cl.
*B29D 22/00* (2006.01)
*B29D 23/00* (2006.01)

(Continued)

(52) U.S. Cl.
CPC . *C08K 3/04* (2013.01); *C08J 5/046* (2013.01); *D01F 1/10* (2013.01); *C08J 2321/00* (2013.01);

(Continued)

(58) Field of Classification Search
CPC ........ C08K 3/04; C08J 5/046; C08J 2321/00; C08J 2327/06; D01F 1/10; Y10T 428/30; Y10T 428/1369; Y10T 428/1352; Y10T 428/139; Y10T 428/1362; Y10T 428/1397; C08L 21/00
USPC .......... 428/36.9, 221, 36.92, 35.7, 36.1, 36.3, 428/408; 977/734, 778; 524/539, 502, 35, 524/500, 495
See application file for complete search history.

(56) References Cited

U.S. PATENT DOCUMENTS 2,947,340 A  8/1960 French
2,979,101 A  4/1961 Willis (Continued)

FOREIGN PATENT DOCUMENTS

EP  0374356  6/1990
EP  1574551  9/2005

(Continued)

OTHER PUBLICATIONS

Supplementary European Search Report for European Application No. 10753965.2, mailed Aug. 2, 2012, 6 pages.

(Continued)

*Primary Examiner* — Michael C Miggins
(74) *Attorney, Agent, or Firm* — Oblon, McClelland, Maier & Neustadt, L.L.P.

(57) ABSTRACT

Polymeric article reinforced with a reinforcing component. The reinforcing component includes a composition made from at least one polymer and graphene sheets.

18 Claims, 1 Drawing Sheet

(51) Int. Cl.
*B32B 1/08* (2006.01)
*C08K 3/04* (2006.01)
*C08J 5/04* (2006.01)
*D01F 1/10* (2006.01)
*C08L 21/00* (2006.01)

(52) U.S. Cl.
CPC .............. *C08J 2327/06* (2013.01); *C08L 21/00* (2013.01); *Y10T 428/139* (2015.01); *Y10T 428/1352* (2015.01); *Y10T 428/1362* (2015.01); *Y10T 428/1369* (2015.01); *Y10T 428/1397* (2015.01); *Y10T 428/30* (2015.01)

(56) References Cited

U.S. PATENT DOCUMENTS

| | | | |
|---|---|---|---|
| 4,204,984 | A | 5/1980 | Neubert |
| 7,659,350 | B2 | 2/2010 | Prud'Homme et al. |
| 7,745,528 | B2 | 6/2010 | Prud'Homme et al. |
| 7,771,824 | B2 | 8/2010 | Herrera-Alonso et al. |
| 7,935,754 | B2 | 5/2011 | Prud'Homme et al. |
| 8,047,248 | B2 | 11/2011 | Prud'Homme et al. |
| 8,048,214 | B2 | 11/2011 | Prud'Homme et al. |
| 8,048,931 | B2 | 11/2011 | Prud'Homme et al. |
| 8,048,950 | B2 | 11/2011 | Prud'Homme et al. |
| 8,053,508 | B2 | 11/2011 | Korkut et al. |
| 8,063,134 | B2 | 11/2011 | Prud'Homme et al. |
| 8,066,964 | B2 | 11/2011 | Prud'Homme et al. |
| 8,105,976 | B2 | 1/2012 | Prud'Homme et al. |
| 8,110,026 | B2 | 2/2012 | Prud'Homme et al. |
| 8,110,524 | B2 | 2/2012 | Prud'Homme et al. |
| 8,192,870 | B2 | 6/2012 | Aksay et al. |
| 8,278,757 | B2 | 10/2012 | Crain et al. |
| 8,449,959 | B2 | 5/2013 | Aksay et al. |
| 8,697,485 | B2 | 4/2014 | Crain et al. |
| 2003/0159768 | A1 | 8/2003 | Fritsch et al. |
| 2004/0261928 | A1 | 12/2004 | Imhoff et al. |
| 2006/0033231 | A1 | 2/2006 | Reuter |
| 2006/0216222 | A1 | 9/2006 | Jang |
| 2006/0241237 | A1 | 10/2006 | Drzal et al. |
| 2007/0092432 | A1 | 4/2007 | Prud'Homme |
| 2007/0092716 | A1 | 4/2007 | Guo et al. |
| 2007/0113759 | A1 | 5/2007 | Roth et al. |
| 2007/0131915 | A1 | 6/2007 | Stankovich et al. |
| 2008/0090953 | A1 | 4/2008 | Elkovitch et al. |
| 2008/0149561 | A1 | 6/2008 | Chu et al. |
| 2008/0170982 | A1 | 7/2008 | Zhang et al. |
| 2008/0171824 | A1 | 7/2008 | Cieslinski et al. |
| 2008/0207799 | A1 | 8/2008 | Berndt et al. |
| 2008/0315453 | A1 | 12/2008 | Molitor et al. |
| 2009/0233057 | A1 | 9/2009 | Aksay et al. |
| 2011/0049437 | A1 | 3/2011 | Crain et al. |
| 2011/0114897 | A1 | 5/2011 | Aksay et al. |
| 2011/0178224 | A1 | 7/2011 | Pan et al. |
| 2012/0088084 | A1 | 4/2012 | Prud'Homme et al. |
| 2012/0121840 | A1 | 5/2012 | Aksay et al. |
| 2012/0145234 | A1 | 6/2012 | Roy-Mayhew et al. |
| 2012/0237749 | A1 | 9/2012 | Aksay et al. |
| 2012/0244333 | A1 | 9/2012 | Aksay et al. |
| 2012/0255607 | A1 | 10/2012 | Roy-Mayhew et al. |
| 2014/0079932 | A1 | 3/2014 | Aksay et al. |
| 2014/0177178 | A1 | 6/2014 | Crain et al. |

FOREIGN PATENT DOCUMENTS

| | | |
|---|---|---|
| EP | 1950328 | 7/2008 |
| GB | 2009270 | 6/1979 |
| WO | WO 2004/080217 | 9/2004 |
| WO | WO 2008/045778 | 4/2008 |
| WO | WO 2008/097343 | 8/2008 |
| WO | WO 2008/130431 | 10/2008 |
| WO | WO 2008/156333 | 12/2008 |

OTHER PUBLICATIONS

Office Action for European Application No. 10753965.2, mailed Jul. 24, 2013, 4 pages.
Office Action for U.S. Appl. No. 13/234,602, mailed Jan. 28, 2013, 14 pages.
Office Action for U.S. Appl. No. 13/234,602, mailed Jul. 30, 2013, 11 pages.
International Search Report for International Application No. PCT/US2010/027439, mailed Jul. 12, 2010, 2 pages.
International Preliminary Report on Patentability for International Application No. PCT/US2010/027439, dated Sep. 20, 2011, 8 pages.
Office Action for U.S. Appl. No. 13/234,668, mailed Dec. 27, 2012, 11 pages.
Office Action for U.S. Appl. No. 13/234,668, mailed Aug. 7, 2013, 11 pages.
Supplementary European Search Report for European Application No. 10753968.6, mailed Aug. 2, 2012, 6 pages.
Office Action for European Application No. 10753968.6, mailed Aug. 16, 2013, 3 pages.
International Search Report for International Application No. PCT/US2010/027447, mailed Dec. 6, 2010, 2 pages.
International Preliminary Report on Patentability for International Application No. PCT/US2010/027447, dated Sep. 20, 2011, 6 pages.
Supplementary European Search Report for European Application No. 10753966.0, mailed Aug. 2, 2012, 6 pages.
Office Action for European Application No. 10753966.0, mailed Dec. 17, 2013, 3 pages.
Office Action for European Application No. 10753966.0, mailed May 29, 2013, 3 pages.
Office Action for U.S. Appl. No. 13/234,654, mailed Jun. 20, 2012, 24 pages.
International Search Report for International Application No. PCT/US2010/027440, mailed Jun. 22, 2010, 2 pages.
International Preliminary Report on Patentability for International Application No. PCT/US2010/027440, dated Sep. 20, 2011, 9 pages.
Chu, X. et al., "Surface Modification of Carbons for Enhanced Electrochemical Activity," Materials Science and Engineering, B49:53-60 (1997).
U.S. Appl. No. 14/515,019, filed Oct. 15, 2014, Prud'Homme, et al.
U.S. Appl. No. 14/555,955, filed Nov. 28, 2014, Roy-Mayhew, et al.
U.S. Appl. No. 14/379,145, filed Aug. 15, 2014, Aksay, et al.

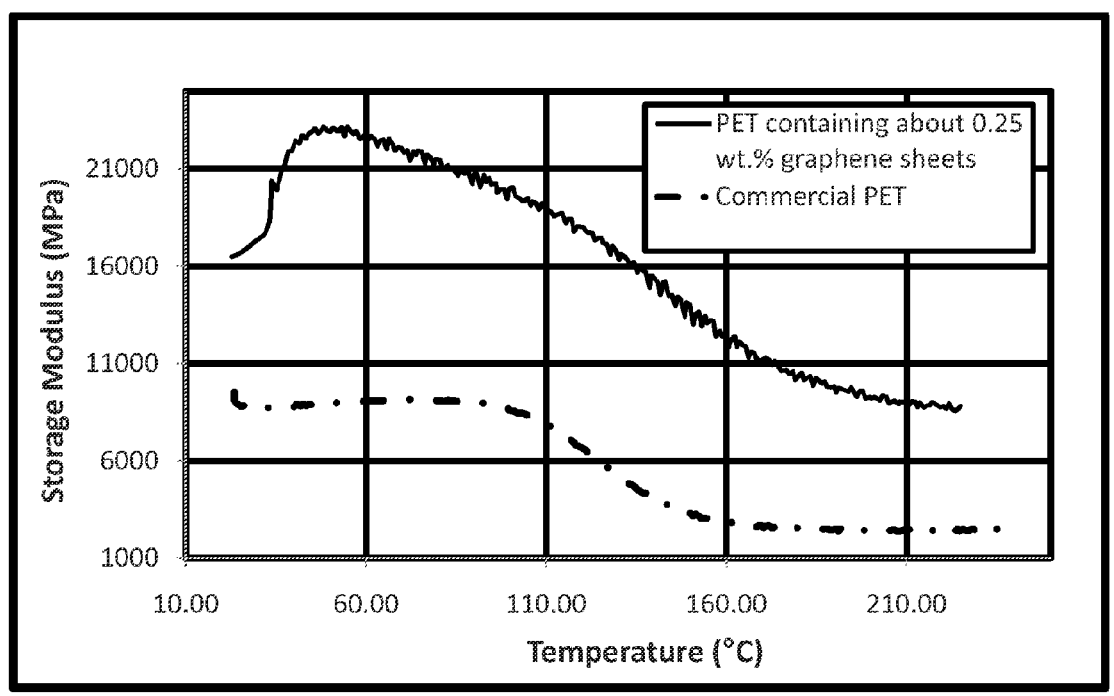

REINFORCED POLYMERIC ARTICLES

CROSS REFERENCE TO RELATED APPLICATIONS

This application is a continuation of U.S. patent application Ser. No. 13/234,654, entitled "Reinforced Polymeric Materials," filed Sep. 16, 2011, which is a continuation of International Application No. PCT/US10/27440, filed Mar. 16, 2010, which claims priority to, and the benefit of U.S. Provisional Application No. 61/160,590, filed on Mar. 16, 2009, entitled "Reinforced Polymeric Articles," the disclosures of each of which are incorporated by reference herein in their entirety.

This application is also related to pending U.S. application Ser. No. 13/234,602, entitled "Polymeric Fibers and Articles Made Therefrom," filed on Sep. 16, 2011 and U.S. application Ser. No. 13/234,668, entitled "Tire Cords," filed on Sep. 16, 2011, the disclosures of each of which are incorporated by reference herein in their entirety.

FIELD OF THE INVENTION

The present invention relates to polymeric articles reinforced with a reinforcing agent made from compositions comprising at least one polymer and graphene sheets.

BACKGROUND

The physical properties of polymeric fibers (which can include, depending on the polymeric material, high modulus, high strength, high toughness, high stiffness, high fatigue resistance (including bending and expansion/compression fatigue resistance), dimensional stability, abrasion resistance, shrinkage, thermal degradation stability, and chemical resistance, among other attributes) have enabled them to be widely used to reinforce many polymeric articles, including mechanical rubber goods, belts, membrane fabrics, hoses, diaphragms, and the like. Their light weight and ease of processing have allowed polymeric fibers to replace metals partially or wholly in many applications.

It would, however, be desirable to obtain polymeric fibers having further improved properties, including one or more of modulus, strength, dimensional stability, fatigue resistance, impact resistance, and shrinkage.

Improved modulus and/or strength per unit weight could, for example, allow for the construction of lighter polymeric goods. Improved modulus and/or strength could also permit the replacement of metals (such as steel) or reduction of the amount of metal used in certain applications. For example, alternative warp and/or weft cord constructions could be used for some reinforcing applications.

For example, alternative warp and/or weft cord constructions in a belt could be used to be decrease the reinforcement weight per unit area, which could offer goods (including mechanical rubber goods) such as belts having lower operating and end-use costs. Bending resistance and warp crimp requirements could be improved, improving the hysteresis and/or dynamic elongation properties of reinforcing agents and reinforced articles.

Increased impact resistance and shock absorbance of reinforcing agents and reinforced articles could lower maintenance costs and end-use performance. Increased thermal and/or electrical conductivity could offer more end-use possibilities for reinforced polymer goods, such as self-cleaning articles and applications where static dissipativity is important.

Thermal shrinkage and dimensional stability of reinforced polymer goods (including mechanical goods) (such as braided hoses, wrapped hoses, membranes, profiles, and diaphragms) could increase their durability (particularly under flexing) and useful lifetime. Control of shrinkage forces can be important when processing articles, particularly those having complex shapes.

SUMMARY OF THE INVENTION

Disclosed and claimed herein are articles comprising at least one polymeric component and at least one reinforcing component, wherein the reinforcing component includes a composition that has a polymer and graphene sheets.

BRIEF DESCRIPTION OF THE DRAWINGS

FIG. 1 shows a plot of the storage modulus vs. temperature of monofilaments comprising poly(ethylene terephthalate) containing 0.25 wt. % graphene sheets and of commercial PET monofilaments.

DETAILED DESCRIPTION

Articles described herein comprise at least one polymeric component and at least one reinforcing component. The reinforcing component includes a composition that comprises at least one polymer and graphene sheets. The reinforcing component can be in any suitable form, such as fibers, yarns, cords, fabrics, strips, tapes, plies, etc.

Fibers described herein comprise a composition including a polymer and graphene sheets. The fibers can be in the form of polyamides, polyesters, acrylics, acetates, modacrylics, spandex, lyocells, and the like. Such fibers (also referred to herein as filaments) can take on a variety of forms, including, staple fibers (also referred to as spun fibers), monofilaments, multifilaments, and the like. The fibers can have a number of different average diameters. For example, in some embodiments the fibers can have a number average diameter of about 1 μm to about 1.5 mm or of about 15 μm to about 1.5 mm.

The fibers can be of any cross-sectional shape. For example, they can have a circular or substantially circular cross-section, or have cross-sections that are, for example, oval, star-shaped, multilobal (including trilobal), square, rectangular, polygonal, irregular, etc. They can also be hollow in their entirety or in part and can have a foam-like structure. The fibers can be crimped, bent, twisted, woven or the like.

Fibers can be in the form of a multicomponent (such as a bicomponent) composite structure (these are also referred to as conjugate fibers), including, for example, multilayered structures comprising two or more concentric and/or eccentric layers (including inner core and outer sheath layers), a side-by-side structure, or the like. These can be obtained, for example, by extruding two or more polymers from the same spinnerette.

In one embodiment, each of the components of the structures include a form of the composition. In another embodiment, at least one of the components include a form of the composition and another of the components include a material without the composition. For example, other components (such as layers) may comprise other polymeric materials.

Examples of bicomponent structures include fibers comprising a polyester core and a copolyester sheath, a polyester core and a polyethylene sheath, a polyester core and a polyamide sheath, a poly(ethylene naphthalate) core and a sheath of another polyester, a polyamide core and a copolyamide sheath, a polyamide core and a polyester sheath, a polypropylene core and a polyethylene sheath, and the like.

The fibers can be formed into fabrics that comprise at least one fiber of the present invention. The fibers can also be formed into yarns that comprise at least one fiber of the present invention and can optionally comprise other fibers. The yarns can be in the form of filament yarns, spun yarns, and the like. The yarns can additionally be formed into cords that comprise at least one yarn and/or filament of the present invention. Fabrics may be formed from one or more fibers, cords, yarns, etc.

The fibers, yarns, and/or cords can be formed into fabrics having enhanced tensile properties and strengths and tenacities. The fabrics can be woven fabrics, non-woven fabrics (including spunbonded, spunlaid, spun laced, etc. fabrics), knit fabrics, and the like and can include additional components such as, for example, fibers, yarns, and/or cords other than those comprising polymer and graphene. The fibers can also be formed into microfiber fabrics.

The polymers can be of any suitable type, including thermoplastics, elastomers, non-melt-processable polymers, thermoset polymers, etc. Examples of polymers include, but are not limited to: polyamides, polyesters, polyolefins (such as polyethylene, ultrahigh molecular weight polyethylene, linear low density polyethylene (LLDPE), low density polyethylene (LDPE), high density polyethylene, polypropylene, and olefin copolymers), cellulosic polymers, rayon, cellulose acetate, acrylics, poly(methyl methacrylate) and other acrylate polymers, poly(phenylene sulfide) (PPS), poly(acrylonitrile) and poly(acrylonitrile) copolymers (such as copolymers with vinyl acetate, methyl acrylate, and/or methyl methacrylate), melamine polymers, polybenzimidazole (FBI), polyurethanes (including thermoplastics and thermosets), poly(p-phenylene-2,6-benzobisoxazole) (PBO), polyphenylene benzobisthiazole, poly{2,6-diimidazo[4,5-b:4',5'-e]pyridinylene-1,4-(2,5-dihydroxy)phenylene}) (PIPD), liquid crystalline polyesters, aramids (such as those sold by DuPont under the trademarks Kevler® and Nomex®, including poly(m-phenylene isophtalamide)s and poly(p-phenylene terephthalamide)s, and co-poly-(paraphenylene/3,4'-oxydiphenylene terephthalamide)), and polymers derived from polyurethane and aliphatic polyethers (including polyether polyols such as poly(ethylene glycol), poly(propylene glycol), poly(tetramethylene ether) glycol (PTMEG), and the like)).

Other polymers include, for example, styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), acrylonitrile/butadiene/styrene (ABS), styrene/acrylonitrile polymers (SAN), styrene/maleic anhydride polymers, poly(ethylene oxide), poly(propylene oxide), poly(acrylonitrile), polycarbonates (PC), polyamides, polyesters, liquid crystalline polymers (LCPs), poly(lactic acid), poly(phenylene oxide) (PPO), PPO-polyamide alloys, polysulfones (PSU), polyether sulfones, polyurethanes, polyetherketone (PEK), polyetheretherketone (PEEK), polyimides, polyoxymethylene (POM) homo- and copolymers, polyetherimides, fluoropolymers (such as polytetrafluoroethylene (PTFE), fluorinated ethylene propylene polymers (FEP), poly(vinyl fluoride), and poly(vinylidene fluoride)), poly(vinylidene chloride), poly(vinyl chloride), and epoxy polymers.

The polymers can be elastomers such as, for example, polyurethanes, copolyetheresters, rubbers (including butyl rubbers and natural rubbers), styrene/butadiene copolymers, styrene/ethylene/butadiene/styrene copolymer (SEBS), polyisoprene, ethylene/propylene copolymers (EPR), ethylene/propylene/diene monomer copolymers (EPDM), polysiloxanes, and polyethers (such as poly(ethylene oxide), poly(propylene oxide), and their copolymers).

Preferred polymers include polyamides and polyesters (including, for example thermoplastic and semicrystalline polyamides and polyesters), aramides, polyolefins, and rayons.

Examples of suitable polyamides include, but are not limited to, aliphatic polyamides (such as polyamide 4,6; polyamide 6,6; polyamide 6; polyamide 11; polyamide 12; polyamide 6,9; polyamide 6,10; polyamide 6,12; polyamide 10,10; polyamide 10,12; and polyamide 12,12), alicyclic polyamides, and aromatic polyamides (such as poly(m-xylylene adipamide) (polyamide MXD,6) and polyterephthalamides such as poly(dodecamethylene terephthalamide) (polyamide 12,T), poly(decamethylene terephthalamide) (polyamide 10,T), poly(nonamethylene terephthalamide) (polyamide 9,T), the polyamide of hexamethylene terephthalamide and hexamethylene adipamide, and the polyamide of hexamethyleneterephthalamide, and 2-methylpentamethyleneterephthalamide) and copolymers of the foregoing. Preferred polyamides include polyamide 6,6; polyamide 6; and copolymers of polyamide 6 and polyamide 6,6. The polyamide 6,6 may have a relative viscosity of at least about 65 when measured in 96% formic acid. The polyamide 6 may have a relative viscosity of at least about 85 when measured in 96% formic acid.

Examples of suitable polyesters include, but are not limited to, semiaromatic polyesters, such as poly(butylene terephthalate) (PBT), poly(ethylene terephthalate) (PET), poly(1,3-propylene terephthalate) (PPT), poly(ethylene naphthalate) (PEN), and poly(cyclohexanedimethanol terephthalate) (PCT)), aliphatic polyesters (such as poly(lactic acid), and copolymers thereof. Preferred polyesters are PET, PPT, and PEN. Particularly preferred is PET. Polyesters can include copolyetheresters. Preferred polyesters have an intrinsic viscosity of at least about 0.8 when measured in ortho-chlorophenol.

The graphene sheets are graphite sheets preferably having a surface area of at least about 100 m$^2$/g to about 2,630 m$^2$/g. In some embodiments, the graphene sheets primarily, almost completely, or completely comprise fully exfoliated single sheets of graphite (these are approximately 1 nm thick and are often referred to as "graphene"), while in other embodiments, they can comprise partially exfoliated graphite sheets, in which two or more sheets of graphite have not been exfoliated from each other. The graphene sheets can comprise mixtures of fully and partially exfoliated graphite sheets.

One method of obtaining graphene sheets is from graphite and/or graphite oxide (also known as graphitic acid or graphene oxide). Graphite can be treated with oxidizing and intercalating agents and exfoliated. Graphite can also be treated with intercalating agents and electrochemically oxidized and exfoliated. Graphene sheets can be formed by ultrasonically exfoliating suspensions of graphite and/or graphite oxide in a liquid. Exfoliated graphite oxide dispersions or suspensions can be subsequently reduced to graphene sheets. Graphene sheets can also be formed by mechanical treatment (such as grinding or milling) to exfoliate graphite or graphite oxide (which would subsequently be reduced to graphene sheets).

Graphite oxide can be reduced to graphene by chemical reduction using hydrogen gas or other reducing agents.

Examples of useful chemical reducing agents include, but are not limited to, hydrazines (such as hydrazine, N,N-dimethylhydrazine, etc.), sodium borohydride, hydroquinone, citric acid, etc. For example, a dispersion of exfoliated graphite oxide in a carrier (such as water, organic solvents, or a mixture of solvents) can be made using any suitable method (such as ultrasonication and/or mechanical grinding or milling) and reduced to graphene sheets.

One method of exfoliation includes thermal exfoliation and ultrasonication of suspensions. The graphite can be any suitable type, including natural, Kish, and synthetic/pyrolytic graphites and graphitic materials such as, for example, graphitic carbon fibers (including those derived from polymers), and highly oriented pyrolytic graphite.

In one method of preparing graphene sheets, graphite is first oxidized to graphite oxide, which is then thermally exfoliated to form high surface area graphene sheets in the form of thermally exfoliated graphite oxide. Such a method is generally described in U.S. Patent Pub. No. 2007/0092432, entitled "Thermally Exfoliated Graphite Oxide" by Prud'Homme et al., the disclosure of which is incorporated herein by reference. The thusly formed thermally exfoliated graphite oxide may display little or no signature corresponding to graphite or graphite oxide in its X-ray diffraction pattern.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, and the like. Preferred oxidants include $KClO_4$; $HNO_3$ and $KClO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. A preferred intercalation agent includes sulfuric acid. Graphite can also be treated with intercalating agents and electrochemically oxidized.

The graphene sheets preferably have an average aspect ratio of about 100 to 100,000 (where "aspect ratio" is defined as the ratio of the longest dimension of the sheet to the shortest dimension of the sheet).

The graphene sheets preferably have a surface area of from about 100 $m^2/g$ to about 2,630 $m^2/g$, or more preferably of from about 200 $m^2/g$ to about 2,630 $m^2/g$, or yet more preferably of from about 300 $m^2/g$ to about 2,630 $m^2/g$, or even more preferably from about 350 $m^2/g$ to about 2,630 $m^2/g$, or still more preferably of from about 400 $m^2/g$ to about 2,630 $m^2/g$, or further more preferably of from about 500 $m^2/g$ to about 2,630 $m^2/g$. In another preferred embodiment, the surface area is about 300 $m^2/g$ to about 1,100 $m^2/g$. A single graphite sheet has a maximum calculated surface area of 2,630 $m^2/g$. The surface area includes all values and subvalues therebetween, especially including 400, 500, 600, 700, 800, 900, 100, 110, 1,200, 1,300, 1,400, 1,500, 1,600, 1,700, 1,800, 1,900, 2,000, 2,100, 2,200, 2,300, 2,400, 2,500, and 2,630 $m^2/g$.

Surface area can be measured using either the nitrogen adsorption/BET method at 77 K or a methylene blue (MB) dye method in a liquid solution. The dye method is carried out as follows. A known amount of graphene sheets is added to a flask. At least 1.5 g of MB per gram of graphene sheets is then added to the flask. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the graphene sheets. The surface area of the graphene sheets is then calculated using a value of 2.54 $m^2$ of surface covered per milligram of MB adsorbed.

The graphene sheets preferably have a bulk density of from about 0.1 $kg/m^3$ to at least about 200 $kg/m^3$. The bulk density includes all values and subvalues therebetween, especially including 0.5, 1, 5, 10, 15, 20, 25, 30, 35, 50, 75, 100, 125, 150, and 175 $kg/m^3$.

The graphene sheets can be functionalized with, for example, oxygen-containing functional groups (including, for example, hydroxyl, carboxyl, and epoxy groups) and typically have an overall carbon to oxygen molar ratio (C/O ratio), as determined by elemental analysis of at least about 1:1, or more preferably, at least about 3:2. Examples of carbon to oxygen ratios include about 3:2 to about 85:15; about 3:2 to about 20:1; about 3:2 to about 30:1; about 3:2 to about 40:1; about 3:2 to about 60:1; about 3:2 to about 80:1; about 3:2 to about 100:1; about 3:2 to about 200:1; about 3:2 to about 500:1; about 3:2 to about 1000:1; about 3:2 to greater than 1000:1; about 10:1 to about 30:1; about 80:1 to about 100:1; about 20:1 to about 100:1; about 20:1 to about 500:1; about 20:1 to about 1000:1. In some embodiments of the invention, the carbon to oxygen ratio is at least about 10:1, or at least about 20:1, or at least about 35:1, or at least about 50:1, or at least about 75:1, or at least about 100:1, or at least about 200:1, or at least about 300:1, or at least about 400:1, or at least 500:1, or at least about 750:1, or at least about 1000:1; or at least about 1500:1, or at least about 2000:1. The carbon to oxygen ratio also includes all values and subvalues between these ranges.

The surface of the graphene sheets can be modified by the addition of molecules including hydrocarbons, and those containing neutral or charged functional groups, such as oxygen-, nitrogen-, halogen-, sulfur-, carbon-containing functional groups. Examples of functional groups include hydroxyl groups, amine groups, ammonium groups, sulphates, sulphonates, epoxy groups, carboxylate and carboxylic acid groups, esters, anhydrides, and the like. The modifying molecules may be bound to the surface of the graphene sheets covalently, ionically, via hydrogen bonding, electrostatically, via physical adsorption, and the like.

The graphene sheets can contain atomic scale kinks due to the presence of lattice defects in the honeycomb structure of the graphite basal plane. These kinks can be desirable to prevent the stacking of the single sheets back to graphite oxide and/or other graphite structures under the influence of van der Waals forces. Kinks may also be desirable for adjusting the moduli of the sheets in the composite applications where at low strains the kinks yield at low stress levels and thus provide a gradually increasing modulus (75 to 250 GPa), and at high strains moduli as high as 1 TPa may be attained. The kinks can also be desirable for mechanical interlocking in the composite structures.

The compositions can optionally further include additional polymers and/or additional additives, including stabilizers (such as thermal, oxidative, and/or UV light resistant stabilizers), nucleating agents, colorants (such as pigments, dyes, and the like), other nanofillers (such as nanoclays), other carbon-based fillers (such as carbon nanotubes, carbon black, graphite, and the like), lusterants, delusterants (e.g., titanium dioxide), lubricants, dye-adhesion promoters, and the like.

The compositions preferably include at least about 0.0001 wt % graphene sheets, based on the total weight of the graphene sheets and polymer. The graphene sheets can be present in at least about 0.005 wt %, in at least about 0.001 wt %, in at least about 0.01 wt %, in at least about 0.05 wt %, in at least about 0.1 wt %, in at least about 0.2 wt %, or in at least about 0.25 wt % (where all weight percentages are based on the total weight of the graphene sheets and polymer.

Preferred ranges in which the graphene sheets are present in the compositions include from about 0.0001 wt % to about 3 wt %, from about 0.001 wt % to about 3 wt %, from about 0.005 wt % to about 3 wt %, from about 0.01 wt % to about 3 wt %, from about 0.01 wt % to about 2 wt %, from about 0.025 wt % to about 2 wt %, from about 0.05 wt % to about 2 wt %, from about 0.05 wt % to about 1 wt %, from about 0.05 wt % to about 0.5 wt %, from about 0.1 wt % to about 1 wt %, from about 0.1 wt % to about 0.5 wt %, and from about 0.1 wt % to about 0.3 wt % (where all weight percentages are based on the total weight of the graphene sheets and polymer).

If the polymer is melt processable, the compositions can be made prior to fiber formation using any suitable melt-blending method, including using a single or twin-screw extruder, a blender, a kneader, or a Banbury mixer. In one embodiment, the compositions are melt-mixed blends wherein the non-polymeric ingredients are well-dispersed in the polymer matrix, such that the blend forms a unified whole.

The compositions can also be formed by dry blending polymer and a master batch containing polymer and graphene sheets prior to melt spinning. In such a method, the master batch preferably comprises up to about 50 wt % graphene sheets, or more preferably from about 2 wt % to about 20 wt % graphene, based on the total weight of the master batch.

The compositions can also be made by combining graphene sheets (and optionally, additional components) with monomers that are polymerized to form the polymer.

The fibers can be formed by any suitable method such as, for example, extrusion, melt spinning, solvent (wet) spinning, dry spinning, gel spinning, reaction spinning, electrospinning, and the like. For example, when spinning, suitable nozzles (such as spinnerettes) may be selected to form monofilament or multifilament fibers.

When melt spinning, a quench zone can be used for the solidification of the filaments. Examples of quench zones include cross-flow, radial, horizontal, water bath, and other cooling systems. A quench delay zone that may be heat or unheated can be used. Temperature control may be done using any suitable medium, such as a liquid (e.g. water), a gas (e.g. air), and/or the like.

Filaments and/or yarns can be subjected to one or more drawing and/or relaxation operations during and/or subsequent to the spinning process. Drawing and/or relaxation processes can be combined with the spinning processes (such as by using a spin draw process), or can be done using separate drawing equipment to pre-spun fibers in form of monofilament or multifilament yarns. The drawing process can be done, for example, by using different speed single or duo godets or rolls, with heating (hot drawing), without heating (cold drawing), or both. The draw ratio can be controlled by heating and/or annealing during the quench delay zone. Heating can be achieved using heated godets, one or more hot boxes, etc. Relaxation can be done with heating (hot drawing), without heating (cold drawing), or both.

The spinning speed, spinline tension, spinline temperature, number of drawing stages, draw ratio, relaxation ratio, speed ratios between each relaxation and drawing step, and other parameters can vary. The parameters of the drawing and/or relaxation processes can be selected according to the polymer or polymers used, the polymer structures, processability requirements, and/or desired physical and/or chemical properties of the fibers and/or filaments.

Spinning and/or drawing processes can affect one or more of the degree of crystallization, crystallization rates, crystal structure and size, crystalline orientation, amorphous orientation, and the like. Filament and yarn properties (such as tensile modulus and strength) may vary as a function of spinning and/or drawing processes. In certain cases it is possible that the functionalized graphene sheets increase orientation and crystallization of the polymer structure during the spinning processes.

A spin finish oil may optionally be applied to the filament after quenching, but before any drawing and/or relaxation steps. A finish oil may also be optionally applied to fibers before or during subsequent processes such as twisting, weaving, dipping, and the like.

The fibers can be electrically conductive, meaning that they may have a conductivity of at least about $10^{-6}$ S/m. In some embodiments, the fibers preferably have a conductivity of about $10^{-6}$ S/m to about $10^5$ S/m, or more preferably of about $10^{-5}$ S/m to about $10^5$ S/m. In other embodiments, the fibers have a conductivity of at least about 100 S/m, or at least about 1000 S/m, or at least about $10^4$ S/m, or at least about $10^5$ S/m, or at least about $10^6$ S/m.

The reinforcing component can be treated with an adhesive prior to being incorporated into the article. Examples of adhesives include RFL (resorcinol formaldehyde latex) dips, cement, isocyanates, epoxies, and the like.

Examples of the polymeric component include, but are not limited to, resins comprising one or more of rubbers, elastomers, polyurethanes, polyolefins (such as ethylene and including substituted polyolefins and copolymers (random and block), such as styrene-isoprene-styrene and styrene-butadiene-styrene copolymers), chloropolymers (such as poly(vinyl chloride) (PVC)), fluoropolymers, etc. The resins may comprise additional components, such as additives.

Example of rubbers used in the articles of the invention include, but are not limited to, natural rubber, butyl rubber, polybutadiene, stryrene-butadiene rubber, isobutylene-isoprene rubber, chlorobutyl rubber, bromobutyl rubber, neoprene, polyisoprene, chloroprene rubber, nitrile rubber, etc.

Examples of reinforced articles include, but are not limited to, belts (such as conveyor belts, transmission belts, timing belts, v-belts, power transmission belts, pump belts, antistatic belts, etc.), diaphragms and membrane fabrics (such as those used in diaphragms, air brakes, roofing, and the like), hoses (such as automotive under-hood hoses, high pressure hoses, and the like), air springs, textile architectural components, etc. The articles include manufactured rubber goods. Examples of belts include, but are not limited to, belts for open or closed mining operations, belts for transporting luggage and cargo (as in airports, for example), belts used in factory production, belts used in shopping check-out areas, belts used in construction, belts used in power plant operations, man lifts, etc.

EXAMPLES

Example 1

Graphene sheets are added to poly(ethylene terephthalate) (PET) by melt compounding in an extruder to yield a PET composition comprising about 0.25 weight percent graphene sheets. The PET composition is then solid phase polymerized at 215° C. to an IV of about 1 dL/g. The composition is spun into monofilaments that are then post drawn to a draw ratio of about 4 to 5. After drawing, the filaments have a diameter of about 120 microns. The storage modulus of the monofilaments is then measured as a function of temperature using a dynamic mechanical analyzer (DMA). The results are given in Table 1 and in FIG. 1.

Comparative Example 1

The storage modulus of commercial PET monofilaments having an IV of about 0.6 to 0.8 dL/g and a diameter of about 250 microns is measured using a DMA. The commercial PET and the PET of Example 1 have similar tenacities The results are given in Table 1 and FIG. 1.

TABLE 1

|  |  | Example 1 | Comparative Ex. 1 |
|---|---|---|---|
| Storage modulus (GPa) | 32° C. | 17.7 | 8.83 |
|  | 52° C. | 22.9 | 8.99 |
|  | 70° C. | 21.8 | 9.13 |
|  | 90° C. | 20.7 | 9.00 |
|  | 110° C. | 19.0 | 7.85 |
|  | 130° C. | 16.3 | 5.21 |
|  | 150° C. | 14.0 | 3.34 |
|  | 170° C. | 11.2 | 2.56 |
|  | 190° C. | 9.82 | 2.49 |
|  | 210° C. | 8.89 | 2.45 |

What is claimed is:

1. An article comprising:
   a polymeric component and a reinforcing component, wherein the reinforcing component contains a composition comprising a polymer and graphene sheets; and
   wherein the graphene sheets are present in the composition in an amount from about 0.0001 wt % to about 1.5 wt %, based on the total weight of graphene sheets and polymer.

2. The article of claim 1, wherein the reinforcing component includes at least one fiber formed from the composition.

3. The article of claim 1, wherein the reinforcing component includes at least one yarn formed from the composition.

4. The article of claim 1, wherein the reinforcing component includes at least one cord formed from the composition.

5. The article of claim 1, wherein the reinforcing component includes at least one fabric formed from the composition.

6. The article of claim 1, wherein the reinforcing component includes at least one tape or strip formed from the composition.

7. The article of claim 1, wherein the reinforcing component includes at least one ply.

8. The article of claim 1, wherein the polymeric component is one or more selected from the group consisting of polyurethanes and poly(vinyl chlorides).

9. The article of claim 1, wherein the polymer is one or more selected from the group consisting of polyamides, polyesters, polyolefins, aramids, cellulosic polymers, and rayon.

10. The article of claim 9, wherein the polymer is a polyamide.

11. The article of claim 10, wherein the polyamide is one or more of polyamide 6,6; polyamide 6; and polyamide 6,6/polyamide 6 copolymers.

12. The article of claim 9, wherein the polymer is a polyester.

13. The article of claim 12, wherein the polyester is one or more of poly(ethylene terephthalate), poly(ethylene naphthalate), and poly(ethylene terephthalate)/poly(ethylene naphthalate) copolymers.

14. The article of claim 9, wherein the polymer is an aramid.

15. The article of claim 9, wherein the polymer is rayon.

16. The article of claim 1, wherein the polymeric component is a rubber.

17. The article of claim 16, wherein the rubber is one or more selected from the group consisting of natural rubber, butyl rubber, polybutadiene, styrene-butadiene rubber, isobutylene-isoprene rubber, chlorobutyl rubber, bromobutyl rubber, neoprene, polyisoprene, chloroprene rubber, and nitrile rubber.

18. The article of claim 1, wherein the graphene sheets have a surface area of about 100 $m^2$/g to about 2,500 $m^2$/g.

* * * * *